(12) United States Patent
Dabbs

(10) Patent No.: US 11,562,052 B2
(45) Date of Patent: Jan. 24, 2023

(54) COMPUTING SYSTEM AND METHOD FOR VERIFICATION OF ACCESS PERMISSIONS

(71) Applicant: Procore Technologies, Inc., Carpinteria, CA (US)

(72) Inventor: James Dabbs, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 124 days.

(21) Appl. No.: 17/008,547

(22) Filed: Aug. 31, 2020

(65) Prior Publication Data

US 2022/0067130 A1    Mar. 3, 2022

(51) Int. Cl.
*G06F 21/31* (2013.01)
*G06F 9/54* (2006.01)
*G06F 21/62* (2013.01)

(52) U.S. Cl.
CPC .............. *G06F 21/31* (2013.01); *G06F 9/547* (2013.01); *G06F 21/6218* (2013.01); *G06F 2221/2141* (2013.01)

(58) Field of Classification Search
CPC ..................................................... G06F 21/31
See application file for complete search history.

(56) References Cited

U.S. PATENT DOCUMENTS

| 7,984,304 | B1* | 7/2011 | Waldspurger | G06F 21/565 |
| | | | | 717/124 |
| 8,230,484 | B1* | 7/2012 | Wiese | H04L 63/104 |
| | | | | 726/28 |
| 8,832,795 | B2* | 9/2014 | Dowds | G06F 16/9535 |
| | | | | 713/193 |
| 8,931,084 | B1* | 1/2015 | Paya | H04L 67/34 |
| | | | | 713/160 |
| 9,183,358 | B2* | 11/2015 | Inooka | G06F 21/305 |
| 9,218,502 | B1* | 12/2015 | Doermann | H04L 63/10 |

(Continued)

OTHER PUBLICATIONS

Y. Zhu, H. Hu, G.-J. Ahn, Y. Han and S. Chen, "Collaborative integrity verification in hybrid clouds," 7th International Conference on Collaborative Computing: Networking, Applications and Worksharing (CollaborateCom), 2011, pp. 191-200. (Year: 2011).*

(Continued)

*Primary Examiner* — Kari L Schmidt
(74) *Attorney, Agent, or Firm* — Lee Sullivan Shea & Smith LLP

(57) ABSTRACT

An example computing platform may be configured to (i) receive a request to access one or more resources on behalf of a given user, (ii) identify a parameter within the request that requires a permission verification, (iii) apply a verification tag to the parameter, wherein the verification tag is set to a first value indicating that a permission verification has not been successfully performed for the given user with respect to the parameter, (iv) perform a permission verification for the given user with respect to the parameter, (v) based on performing the permission verification, either (a) update the verification tag from the first value to a second value indicating that a permission verification has been successfully performed or (b) leave the verification tag set to the first value, and (vi) determine whether to grant or deny the request based at least in part on the verification tag for the parameter.

20 Claims, 4 Drawing Sheets

(56) References Cited

U.S. PATENT DOCUMENTS

| | | | | |
|---|---|---|---|---|
| 9,953,178 | B2* | 4/2018 | Umbehocker | G06F 21/6218 |
| 10,073,791 | B2* | 9/2018 | Linga | G06F 16/93 |
| 10,200,369 | B1* | 2/2019 | Roundy | H04L 61/5007 |
| 10,536,277 | B1* | 1/2020 | Kruse | G06F 12/1408 |
| 10,708,269 | B1* | 7/2020 | Yancey | G06F 21/604 |
| 10,972,580 | B1* | 4/2021 | Dorn | H04L 41/0246 |
| 11,411,736 | B2* | 8/2022 | Murdoch | H04L 9/3218 |
| 2002/0147917 | A1* | 10/2002 | Brickell | G06F 21/6245 |
| | | | | 713/193 |
| 2005/0177570 | A1* | 8/2005 | Dutta | G06F 21/6227 |
| | | | | 707/999.009 |
| 2005/0289342 | A1* | 12/2005 | Needham | G06F 21/6227 |
| | | | | 713/169 |
| 2006/0294104 | A1* | 12/2006 | Morrison | G06F 16/21 |
| | | | | 707/999.009 |
| 2007/0180275 | A1* | 8/2007 | Metzger | G06F 21/6227 |
| | | | | 713/194 |
| 2008/0134297 | A1* | 6/2008 | Clinick | G11B 20/00166 |
| | | | | 726/4 |
| 2008/0235683 | A1* | 9/2008 | Sreedhar | G06F 9/468 |
| | | | | 718/100 |
| 2009/0150886 | A1* | 6/2009 | Subramanian | G06F 8/71 |
| | | | | 718/100 |
| 2009/0199273 | A1* | 8/2009 | Yalamanchi | G06F 21/6227 |
| | | | | 726/4 |
| 2009/0249435 | A1* | 10/2009 | Madathilparambil George | |
| | | | | G06F 21/74 |
| | | | | 726/1 |
| 2013/0067568 | A1* | 3/2013 | Obasanjo | G06F 21/31 |
| | | | | 726/20 |
| 2013/0097203 | A1* | 4/2013 | Bhattacharjee | G06F 21/604 |
| | | | | 707/783 |
| 2013/0183937 | A1* | 7/2013 | Neal | H04W 12/12 |
| | | | | 455/411 |
| 2013/0185809 | A1* | 7/2013 | Yabe | H04L 63/10 |
| | | | | 726/28 |
| 2013/0246470 | A1* | 9/2013 | Price | G06F 16/13 |
| | | | | 707/783 |
| 2016/0191534 | A1* | 6/2016 | Mallozzi | G06F 21/6218 |
| | | | | 726/4 |
| 2017/0230422 | A1* | 8/2017 | Shimizu | G06F 21/00 |
| 2017/0279625 | A1* | 9/2017 | Safa | H04L 67/06 |
| 2019/0140895 | A1* | 5/2019 | Ennis, Jr | G06F 9/54 |
| 2020/0322143 | A1* | 10/2020 | Voit | G06F 9/45558 |
| 2021/0329037 | A1* | 10/2021 | O'Byrne | H04L 63/205 |
| 2022/0028012 | A1* | 1/2022 | Hockey | G06Q 40/125 |

OTHER PUBLICATIONS

Q. Li, P. P. C. Lee, P. Zhang, P. Su, L. He and K. Ren, "Capability-Based Security Enforcement in Named Data Networking," in IEEE/ACM Transactions on Networking, vol. 25, No. 5, pp. 2719-2730, Oct. 2017. (Year: 2017).*

Xu, Guowen, et al. "Catch you if you deceive me: verifiable and privacy-aware truth discovery in crowdsensing systems." Proceedings of the 15th ACM Asia Conference on Computer and Communications Security. 2020, pp. 178-192. (Year: 2020).*

Amazon API Gateway Developer Guide, Request Validation, https://docs.aws.amazon.com/apigateway/latest/developerguide/api-gateway-method-request-validation.html, retrieved from the Internet Sep. 14, 2020, pp. 352-365.

GitHub—Zendesk/Stronger_Parameters: Type Checking and Type Casting of Parameters for Action Pack, https://github.com/zendesk/stronger_parameters, retrieved from the Internet Sep. 14, 2020, pp. 1-8.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

COMPUTING SYSTEM AND METHOD FOR VERIFICATION OF ACCESS PERMISSIONS

BACKGROUND

Computer systems are susceptible to a myriad of different types of cybersecurity vulnerabilities that may be exploited to gain unauthorized access to a system and/or make unauthorized changes to a system. Such vulnerabilities may target one or more system components, such as the system software and/or hardware. In order to protect against exploitation of computer vulnerabilities, various cybersecurity approaches have been developed.

In general, cybersecurity measures attempt to protect a system's confidentiality, integrity, and/or availability from external threats. Confidentiality measures ensure that access to a system and use of system data is authorized. For example, breach of confidentiality may occur when sensitive information is inadequately protected, resulting in exposure of sensitive data such as credit card information or private healthcare information. Integrity measures ensure that the ability to modify accessible data is authorized. For example, breach of integrity may occur when credentials of an authorized user (e.g., username and password) are accessed by a malicious user and used to make unauthorized modifications to system data. Availability measures ensure uninterrupted access by an authorized user to a system. For example, breach of availability may occur when a system undergoes a denial of service (DOS) attack, where a malicious user is able to exploit one or more system vulnerabilities to disrupt system service such that the system is made unavailable to authorized users.

While many approaches of protecting against such vulnerabilities exist, two fundamental aspects of cybersecurity measures are authentication and authorization. Authentication is the process by which a system verifies the identity of a user. Authentication procedures may include, for example, obtaining credentials (e.g., username and password) or biometrics (e.g., fingerprint or retinal scan) in order to verify that the user is indeed who the user claims to be. Authorization is the process by which a system verifies if the user has permission to make a given user request. For example, a company employee may have authorization to view his salary information but may not have authorization to modify the salary information. Together, authentication and authorization are commonly referred to as access control.

Despite cybersecurity measures attempting to verify access control, access control vulnerabilities exist and may be exploited. One example of a commonly-exploited access control vulnerability is Insecure Direct Object Reference (IDOR), which occurs when an internal reference to an object (e.g., user details, a file, a directory, or a database key) is directly exposed. Such an IDOR vulnerability can then be exploited by a malicious user to access the exposed reference without authorization.

Typically, when a system receives a user request on behalf of a given user to access a given system resource, the system first attempts to authenticate the given user by requesting proof of the user's identity. If a system receives a user input via a web application (e.g., website login) seeking to access the given system resource, this proof may take the form of a username and password. The system may then compare the username and password combination to a user database available to the system in order to determine if the combination is valid. After determining the combination is valid, the system may permit the given user to log into the system's web application. Accordingly, the Uniform Resource Locator (URL) for a given web page of the system's web application that the given user is directed to may include the domain, the path, and at least one parameter pertaining to the given resource, such as an identifier for the given resource. For example, after verifying that the given user is authenticated, the system may direct the given user to a user home page for the given user at the system's web application with the URL "website.com/home?user_id=4517," where the parameter "user_id=4517" includes a resource identifier (e.g., "user_id") and its corresponding value (e.g., "4517"). Using the system's web application, the given user may then attempt to access the given resource, such as the user's profile information, by making a selection on the application web page. The system may then verify whether the given user is authorized to access the given user profile—in other words, whether the given user has permission to access the given user profile—by consulting permission information available to the system in order to determine if the given user has permission to access the user profile designated as "user_id=4517." If the given user does have permission, the system may grant the user request by directing the given user to the profile settings web page with the URL "website.com/user_profile?user_id=4517," where the user can view his profile information.

Because the parameter value "4517" is exposed within the URL, the given user may be able to manipulate the parameter within the URL in an attempt to gain access to information associated with a different reference for which the given user does not have access permission, such as a user profile associated with a different resource identifier (e.g., a different user's profile). For example, the given user may attempt to edit the value for the "user_id" parameter within the URL to read "website.com/user_profile?user_id=4520" in an attempt to bypass authentication for the parameter "user_id=4520" and gain access to a different user profile designated as resource identifier "4520." To protect against such behavior and to minimize the ability for the given user to access information for which the given user does not have permission, the system generally also needs to employ a procedure for determining whether the given user is authorized to view the profile associated with "user_id=4520" prior to granting access, because otherwise, the system may inadvertently allow the given user to gain access to the "user_id=4520" user profile, which would give rise to a security issue.

Another example of a commonly-exploited access control vulnerability is SQL Injection (SQLI), a type of code injection method used to attack a database-driven application (e.g., a web application). SQLI occurs when a malicious SQL query is inserted into an entry field for execution by the application. A malicious user can exploit an SQLI vulnerability to make changes to an application's data without gaining access to the data itself, making SQLI vulnerabilities particularly harmful.

An SQLI vulnerability is commonly exploited using a web application's login webpage. Typically, when a user enters login credentials to log in at a web application's login webpage, the entered text values are sent to a server of the web application to determine if (i) the user exists and (ii) the entered password matches the stored password for that user. The server makes these determinations by executing code in the form of an SQL query incorporating the text values entered by the user. A malicious user may embed, or "inject," SQL commands within the text values entered into the login fields, thereby causing the server to execute unauthorized commands.

For example, if a user enters the text value "user!" in the username entry field and the text value "password123" in the password entry field at an application's login webpage, the application's server may execute a SQL query such as "SELECT password FROM users WHERE username='user!';" to verify if the user exists and if the password provided by the user matches the password stored in a database of the application. Knowing that the application server will execute an SQL query to verify the login credentials, a malicious user may inject an unauthorized SQL command such as "DROP TABLE users;" in the password entry field, which may cause the application server to execute the unauthorized command and delete all user information. A malicious user may also use SQLI to inject a text value such as "OR 1=1—" into the SQL query executed by the application's server to force the selection of a valid username and gain unauthorized access to user data. To protect against such behavior, an application generally needs to employ a procedure for recognizing code injection attempts.

Yet another type of commonly-exploited access control vulnerability is cross-site scripting ("XSS"), a type of code injection method that can be used to attack an application and capture information related to the application's users. One particularly damaging type of XSS is referred to as "stored XSS," which occurs when a malicious script is injected into the application and stored within the application by the application's server. A stored XSS vulnerability is commonly exploited using input fields provided by a web application's webpage. For example, stored XSS may be used to enter a malicious script into a comment entry field or a post entry field, which is then stored within the application and may subsequently be delivered to other users.

Several other types of access control vulnerabilities exist. Accordingly, being adequately equipped to protect against such security vulnerabilities is paramount.

Overview

In accordance with standard cybersecurity measures, computing platforms typically employ procedures for both authenticating a user and also authorizing a user's request to access a system resource (also referred to herein as a user access request), including but not limited to a user's request to create, read, update, or delete a system resource. For instance, upon receiving a request to access a given resource from a given user, a computing platform typically passes the user request to a sub-system for checking permission information in order to determine whether the given user has permission to access the given resource. If the given user does have permission, the system may grant the user request. On the other hand, if the user does not have permission, the system may deny the user request.

However, cybersecurity measures still present vulnerabilities and remain susceptible to exploitation. For instance, while the goal of access control security measures is to pass every user request received by a computing platform through a permission sub-system to verify a user's permission to access a given resource, it is possible that certain user requests may not get checked by a permission sub-system before being processed by the computing platform, which may expose the system to IDOR vulnerabilities and/or other potential security issues. One reason for this is that the computing platforms hosting resources for access by users are often complex systems that are designed to handle many different types of user access requests for many different types of resources, and it is challenging to ensure that such a computing platform will function to authorize every single user access request that is received. Indeed, in many cases, such a computing platform could be comprised of millions of lines of program code that are written by many different teams of programmers and are intended to handle many different types of user access requests that are received via many different front-end interfaces, and auditing this large and diverse universe of program code to ensure that authorization is properly being performed on each single user access request that will be received by the computing platform can be costly and arduous, and ultimately, may not even be practically possible.

To address these and other issues, disclosed herein is a technique for applying access control security measures in a way that minimizes the risk of an unverified user access request being granted by a computing platform. At a high level, after receiving a request that seeks to access one or more resources on a given user's behalf (which may be referred to herein as a "user access request"), the disclosed technique may involve identifying at least one parameter within the user access request that requires a verification of the given user's permissions, applying a verification tag to the at least one identified parameter, and using the verification tag for the at least one identified parameter to determine whether the given user's permissions have been successfully verified with respect to the at least one identified parameter before processing the user access request.

For instance, according to an example embodiment, the disclosed technique may be utilized when a computing platform receives a user access request on behalf of a given user to access one or more resources of the computing platform. Such a user access request may take various forms. For example, the user access request may be a request to read (e.g., view) a resource, update (e.g., edit) a resource, delete a resource, and/or link one resource with another (e.g., by assigning a resource to a particular user), among other possibilities.

After receiving the user access request, the computing platform may then identify at least one parameter in the user access request that requires a verification of the given user's permission (also referred to herein as a "permission verification") prior to granting the user access request. The computing platform may identify the at least one parameter that requires a permission verification in various manners. According to one possible implementation, the computing platform may use available information about the computing platform's Application Programming Interface (API) to identify the at least one parameter. In this respect, the available information about the computing platform's API may take various forms, one example of which may take the form of a schema for the API, among other possibilities. The computing platform may identify the at least one parameter that requires a permission verification in other manners as well.

Further, the at least one parameter that is identified by the computing platform may take various forms. One possible example of a parameter included in a user access request that may require a permission verification may take the form of an identifier of a data resource that is hosted by the platform, which may be referred to herein as a "resource identifier." In this respect, the user access request may include a resource identifier for any of various different types of resources that could possibly be hosted by the computing platform, some representative examples of which may include user accounts, user information, various types of electronic documents (e.g., contracts, blueprints, etc.), various types of electronic data records (e.g., electronic data records related to a construction project such as punch items, requests for information (RFIs), daily logs, etc.), and permission templates, among many other possible types of resources that may be hosted by the computing platform. A parameter included in a user access request that is identified as requiring a permission verification may take other forms as well, including an SQL input parameter and an HTML tag as other examples.

After identifying the at least one parameter that requires a permission verification, the computing platform may apply a verification tag to the at least one identified parameter within the user access request. In general, a verification tag may serve as an indication to the computing platform that the parameter to which the verification tag is applied is of a type that requires verification of a user's permission with respect to the at least one identified parameter before the user access request is granted. For example, a verification tag applied to a resource identifier serves as an indication that a user's permission to access the resource identified by the resource identifier needs to be verified before the user access request can be granted. Further, in addition to serving as an indication that an identified parameter within the user access request requires permission verification, the verification tag may be set to a value that serves to inform the computing platform of the status of the permission verification for the at least one identified parameter (e.g., whether the permission verification for the at least one identified parameter has been successfully performed).

Such a verification tag may take various forms. As one example, a verification tag for a given parameter may take the form of metadata that is appended to the given parameter. As another example, a verification tag for a given parameter may take the form of an additional data field associated with the given parameter that is inserted into the user access request. Other examples are also possible.

Further, in accordance with the present disclosure, the verification tag that is applied to the at least one identified parameter within the user access request may initially be set to a first value indicating that a permission verification has not been successfully performed with respect to the at least one identified parameter. In this respect, the first value indicating that a permission verification has not been successfully performed with respect to an identified parameter may take various forms. For example, the first value may take the form of a numeric value (e.g., "0"), an alphanumeric value, a text value (e.g., "false"), or a "null" value, among other possibilities.

After applying the verification tag to the at least one identified parameter within the user access request, the computing platform may proceed to perform the permission verification with respect to the at least one identified parameter. In general, the function of performing the permission verification with respect to the at least one identified parameter may involve checking permission information for the given user that is available to the computing platform, such as permission information stored in a permission database (or the like) that is accessible by the platform, in order to determine whether the given user has the appropriate permission with respect to the at least one identified parameter. For example, if the at least one identified parameter is a resource identifier, the function of performing the permission verification with respect to the resource identifier may involve checking permission information for the given user to determine whether the given user is permitted to access the particular resource that is identified by the resource identifier. The function of performing the permission verification with respect to the at least one identified parameter may take other forms as well.

If the computing platform successfully performs the permission verification with respect to the at least one identified parameter, the computing platform may update the verification tag for the at least one identified parameter to indicate this updated status of the permission verification. Permission verification may be successful when the computing platform has determined that the given user does have the appropriate permission with respect to the at least one identified parameter. As such, if the computing platform successfully performs the permission verification by determining that the given user does have the appropriate permission with respect to the at least one identified parameter, the computing platform may update the verification tag for the at least one identified parameter by setting the verification tag for the at least one identified parameter to a second value indicating that the permission verification for the at least one identified parameter was successful. In this respect, as with the first value, the second value of the verification tag for the at least one identified parameter indicating that permission verification has been performed successfully may take various forms, including but not limited to a numeric value (e.g., "1"), an alphanumeric value, or a text value (e.g., "true"), among other possibilities.

On the other hand, if the permission verification was not successful (e.g., the computing platform has determined that the given user does not have the appropriate permission with respect to the at least one identified parameter), the computing platform may leave the value of the verification tag unchanged, such that the verification tag continues to indicate that the permission verification with respect to the at least one identified parameter has not been successfully performed.

The computing platform may also update the verification tag in other ways.

In turn, the computing platform may then use the verification tag for the at least one identified parameter as a basis for processing the user access request. For example, if the value of the verification tag indicates that the permission verification was successfully performed, the computing platform may determine that the given user has permission to access the one or more resources and grant the user access request. The computing platform may then take certain actions to execute the user access request. On the other hand, if the verification tag for the at least one identified parameter indicates that the permission verification was not successful, the computing platform may determine that the given user does not have permission to access the one or more resources and deny the user access request. Other outcomes are also possible.

Advantageously, this disclosed technique for controlling user access to resources hosted by a computing platform improves upon existing access control systems in several ways. First, the disclosed technique enables the computing platform to enhance access control security by identifying and applying verification tags to sensitive parameters (e.g., parameters requiring a permission verification) within a user access request at the time the user access request is received. Second, the disclosed technique enables the computing platform to minimize the risk of unauthorized user access to platform resources by granting the user access request only if each identified parameter's respective verification tag has been updated to indicate that a successful permission verification has been performed with respect to each identified parameter. Third, the disclosed technique may be implemented without the need to make extensive changes to a computing platform's existing architecture. As a result, the disclosed technique can be easily incorporated into existing program code and implemented in a way that is scalable and cost-effective.

Accordingly, in one aspect, disclosed herein is a method that involves (i) receiving a request to access one or more resources on behalf of a given user, (ii) identifying a parameter within the request that requires a permission verification, (iii) applying a verification tag to the parameter, wherein the verification tag is set to a first value indicating that a permission verification has not been successfully performed for the given user with respect to the parameter, (iv) performing a permission verification for the given user with respect to the parameter, (v) based on performing the permission verification for the given user with respect to the parameter, either (a) updating the verification tag from the first value to a second value indicating that a permission verification has been successfully performed for the given user with respect to the parameter if the given user's permission with respect to the parameter is successfully verified or (b) leaving the verification tag set to the first value if the given user's permission with respect to the parameter is not successfully verified, and (vi) determining whether to grant or deny the request based at least in part on the verification tag for the parameter.

In another aspect, disclosed herein is a computing platform that includes at least one processor, a non-transitory computer-readable medium, and program instructions stored on the non-transitory computer-readable medium that, when executed by the at least one processor, cause the computing platform to carry out the functions disclosed herein, including but not limited to the functions of the foregoing method.

In yet another aspect, disclosed herein is a non-transitory computer-readable medium having program instructions stored thereon that, when executed by at least one processor, cause a computing platform to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As discussed above, disclosed herein is a technique for enhancing access control security measures by minimizing the risk of an unverified user access request being granted by a computing platform. At a high level, the disclosed technique may involve (i) receiving a user access request that seeks to access one or more resources on behalf of a given user, (ii) identifying at least one parameter in the user access request that requires a permission verification prior to granting the user access request, (iii) applying a verification tag to the at least one identified parameter, (iv) performing a permission verification with respect to the at least one identified parameter, (v) if the permission verification is successfully performed, updating the verification tag for the at least one identified parameter, and (vi) using the verification tag for the at least one identified parameter as a basis for processing the user access request.

Other implementations of the disclosed technique are possible as well.

I. EXAMPLE NETWORK CONFIGURATION

Figure 1:
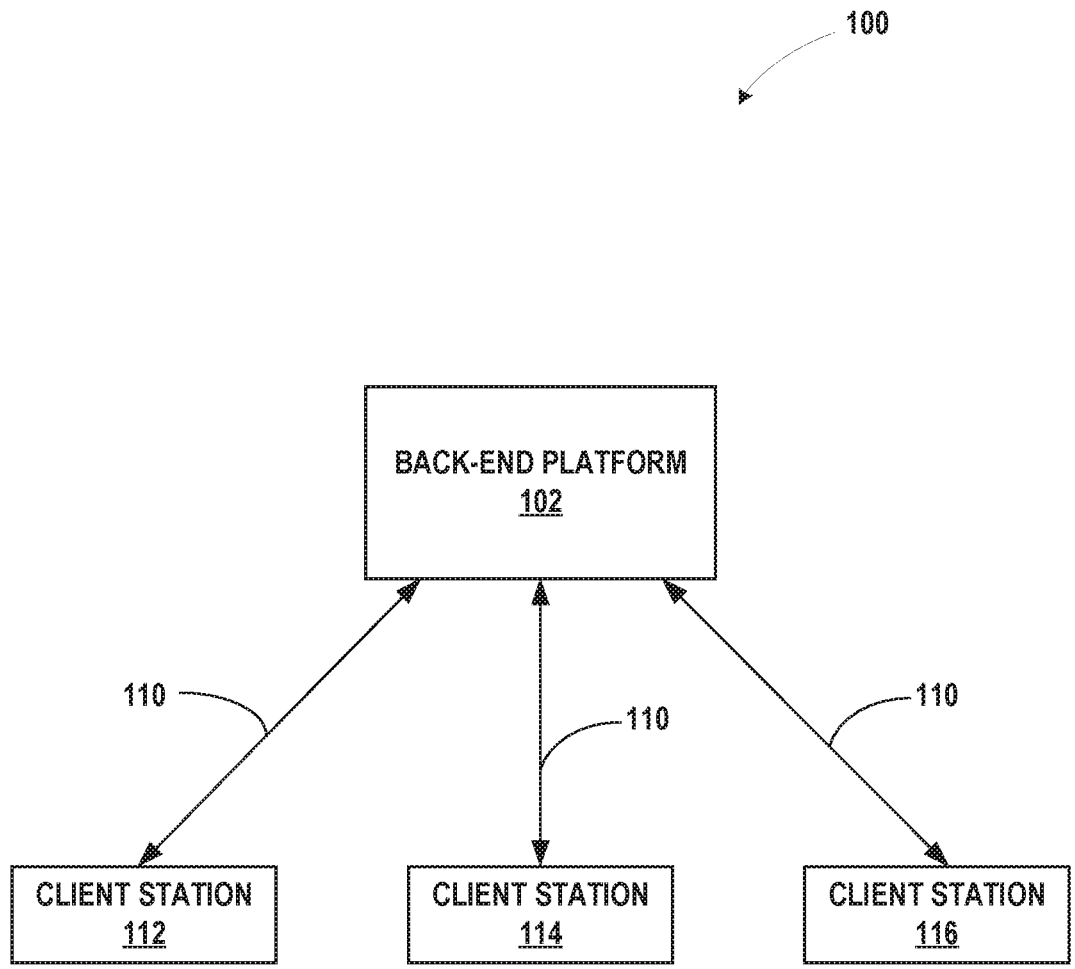
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as three client stations 112, 114, and 116.

In general, back-end computing platform 102 may comprise one or more computing systems that have been provisioned with software for carrying out one or more of the computing platform functions disclosed herein for enhancing access control security measures, including but not limited to functions related to authenticating user accounts, and/or obtaining permissions information. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the computing platform functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the computing platform functions disclosed herein. Other implementations of back-end computing platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end computing platform 102 is configured to communicate with one or more client stations 112, 114, 116 over respective communication paths. Each communication path between back-end computing platform 102 and one of client stations 112, 114, 116 may generally comprise one or more communication networks and/or communications links, which may take any of various forms. For instance, each respective communication path with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end computing platform 102 may be wireless, wired, or some combination thereof, and may carry data according to any of various different communication protocols. Although not shown, the respective communication paths with back-end computing platform 102 may also include one or more intermediate systems. For example, it is possible that back-end computing platform 102 may communicate with a given client station 112, 114, 116 via one or more intermediary systems, such as a host server (not shown). Many other configurations are also possible.

Although not shown in FIG. 1, back-end computing platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
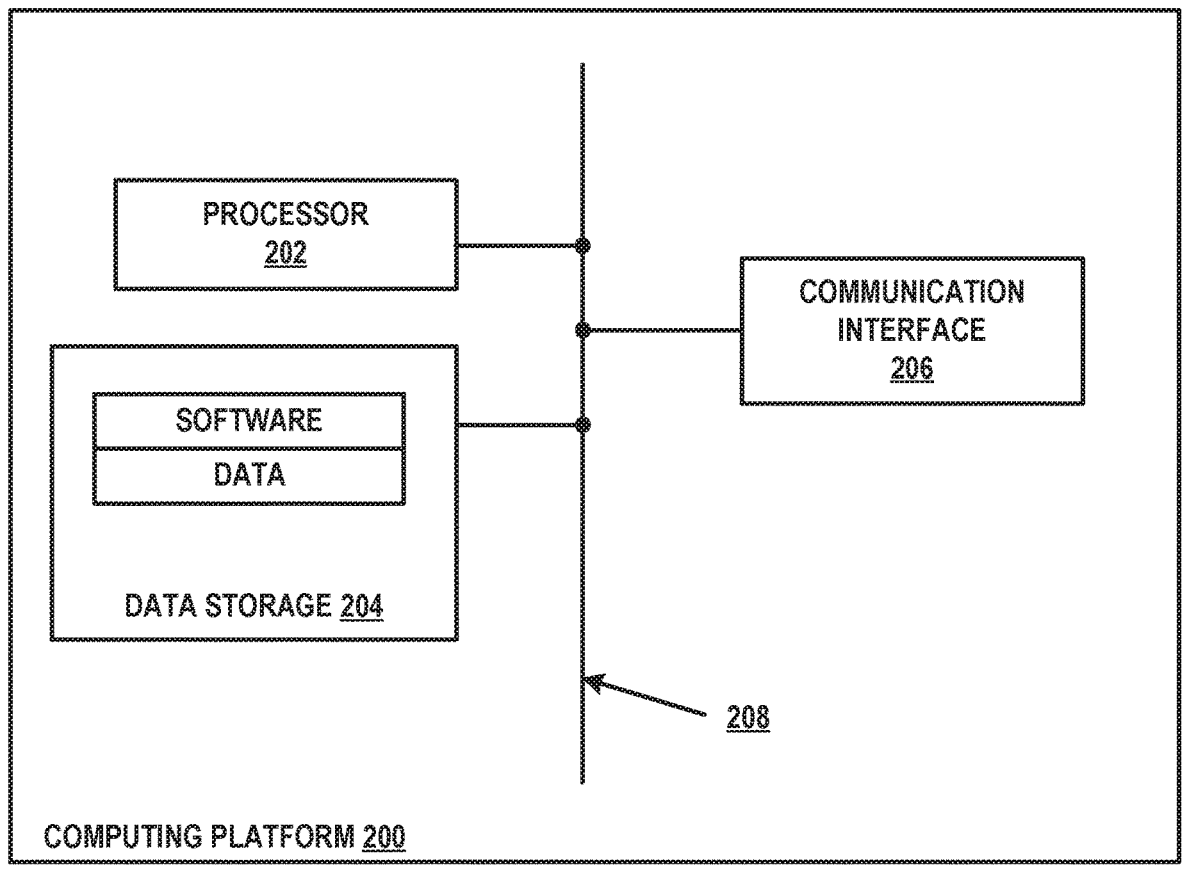
FIG. 2 depicts an example computing platform that may be configured to carry out one or more of the functions of the present disclosure.

FIG. 2 is a simplified block diagram illustrating some structural components that may be included in an example computing platform 200, which could serve as back-end computing platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that platform 200 is configured to perform some or all of the disclosed functions and (ii) data that may be received, derived, or otherwise stored, for example, in one or more databases, file systems, or the like, by platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication, among other possibilities. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE FUNCTIONALITY

As discussed above, disclosed herein is a technique for enhancing access control security measures by minimizing the risk of an unverified user access request being granted by a computing platform. At a high level, the disclosed technique may involve (i) receiving a user access request that seeks to access one or more resources on behalf of a given user, (ii) identifying at least one parameter in the user access request that requires a permission verification prior to granting the user access request, (iii) applying a verification tag to the at least one identified parameter, (iv) performing a permission verification with respect to the at least one identified parameter (v) if the permission verification is successfully performed, updating the verification tag for the at least one identified parameter, and (vi) using the verification tag for the at least one identified parameter as a basis for processing the user access request.

Figure 3:
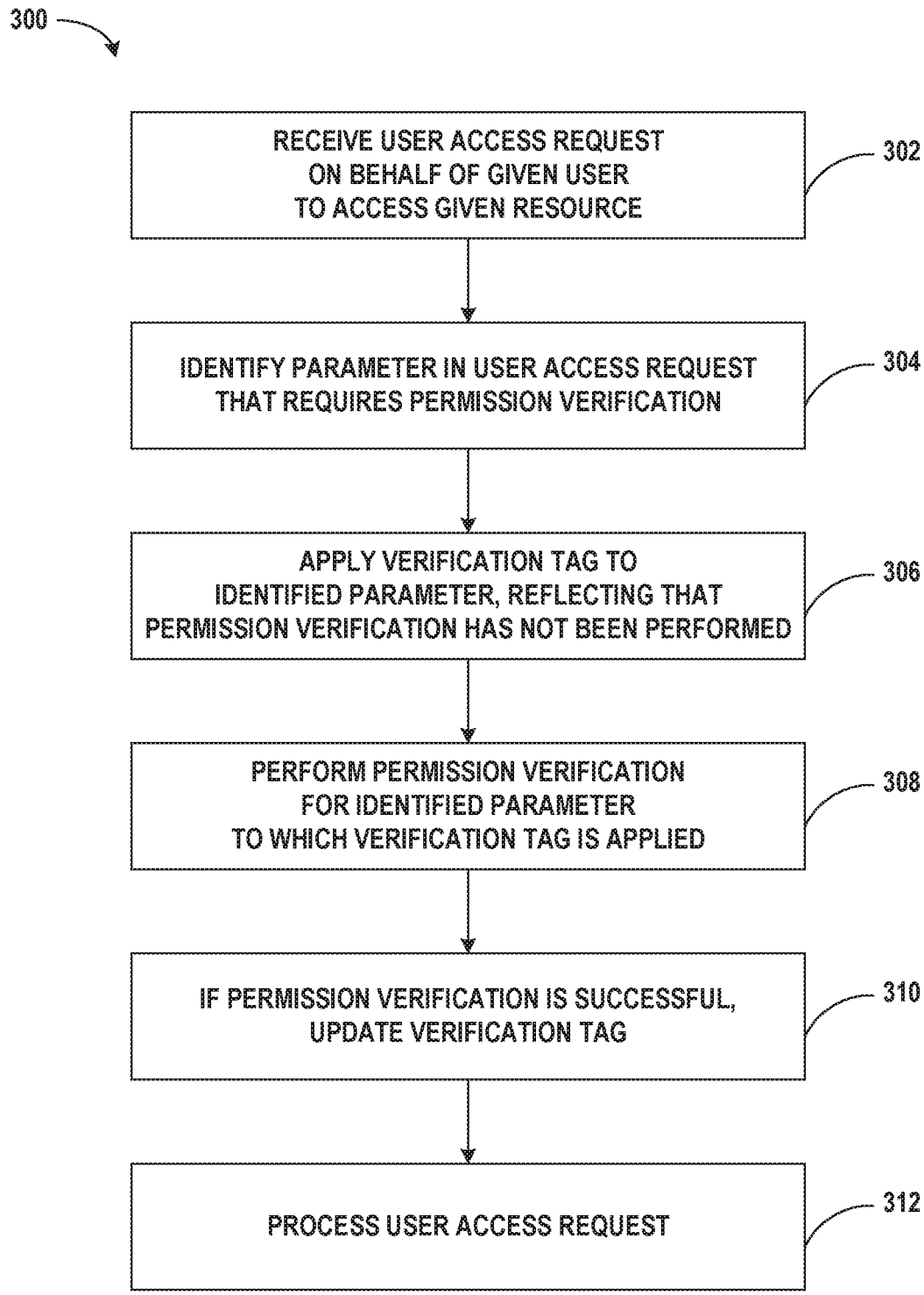
FIG. 3 depicts a functional flow diagram depicting an example process for providing improved access control security measures according to the disclosed technique.

Referring now to FIG. 3, a functional block diagram 300 is provided to illustrate functions of an example process according to one implementation of the disclosed technique for enhancing access control security measures by improving the ability to perform a permission verification for each single user access request received by a computing platform prior to processing the user access request.

The example process 300 of the disclosed technique may begin at block 302, when the computing platform (e.g., computing platform 200 of FIG. 2) receives a user access request on behalf of a given user that is seeking to access one or more resources of the computing platform. The user access request may be generated and sent by a client station (e.g., client station 112 of FIG. 1) based on input provided by the given user at the client station. This user access request may take various forms, examples of which may include a request to read (e.g., view) a resource, update (e.g., edit) a resource, delete a resource, link one resource with another (e.g., by assigning a resource to a particular user), and/or some combination thereof, among other possibilities.

The user access request may generally comprise various parameters related to the access being sought by the given user, such as parameters relating to the given user, the one or more resources the user is seeking to access, and/or the type of access or action the user is seeking with respect to the one or more resource, among other possibilities. The user access request may include additional information as well. As one example, the user access request may include information that enables the computing platform to confirm that the given user is authenticated to access the computing platform, such as an authentication token for the given user that was previously issued by the computing platform or a username and password for the given user, among other possibilities. As another example, if the user access request is received via a web application provided by the computing platform, the user access request may also include a domain and path. Other examples are also possible.

At block 304, after receiving the user access request, the computing platform may identify at least one parameter in the user access request that requires a permission verification prior to granting the user access request. The computing platform may identify the at least one parameter that requires a permission verification in various manners. According to one possible implementation, the computing platform may use available information about the computing platform's API to identify the parameter. In this respect, the available information about the computing platform's API may take various forms. One example of such available information about the computing platform's API may take the form of a schema for the computing platform's API, among other possibilities. The computing platform may identify the parameter that requires a permission verification in other manners as well. Furthermore, the parameter that is identified by the computing platform may take various forms.

One possible example of a parameter included in a user access request that may require a permission verification is an identifier of a data resource that is hosted by the platform, which may be referred to herein as a "resource identifier." In this respect, the user access request may include a resource identifier for any of various different types of resources that could possibly be hosted by the computing platform, some representative examples of which may include user accounts and user information, various types of electronic documents (e.g., contracts, blueprints, etc.), various types of electronic data records (e.g., electronic data records related to a construction project such as punch items, requests for information (RFIs), daily logs, etc.), and permission templates, among many other possible types of resources that may be hosted by the computing platform.

Another possible example of a parameter included in a user access request that may require a permission verification is a parameter that includes SQL syntax, which may potentially include an injected SQL command. Yet another possible example of a parameter included in a user access request that may require a permission verification is a parameter that includes an HTML tag, which may include an embedded script.

Other examples of a parameter included in a user access request that may require a permission verification are also possible.

At block 306, after identifying the parameter in the user access request that requires a permission verification, the computing platform may apply a verification tag to the at least one identified parameter within the user access request. In general, the verification tag may serve as an indication to the computing platform that the at least one identified parameter to which the verification tag is applied is of a type that requires verification of a user's permission with respect to the at least one identified parameter before the user access request is granted. For example, a verification tag applied to a resource identifier serves as an indication that a user's permission to access the resource identified by the resource identifier needs to be verified before the user access request can be granted. Further, in addition to serving as an indication an identified parameter within the user access request requires permission verification, the verification tag may be set to a value that serves to inform the computing platform of the status of the permission verification for the at least one identified parameter (e.g., whether the permission verification for the at least one identified parameter has been successfully performed).

The verification tag may take various forms. As one example, the verification tag may take the form of metadata that may be appended to the at least one identified parameter. As another example, the verification tag may take the form of an additional data field, associated with the at least one identified parameter, that is inserted into the user access request. Other examples are also possible.

Furthermore, in accordance with the present disclosure, the verification tag that is applied to the at least one identified parameter within the user access request may initially be set to a first value indicating that that a permission verification has not been successfully performed with respect to the at least one identified parameter. In this respect, the first value indicating that a permission verification has not been successfully performed with respect to the at least one identified parameter may take various forms. For example, the first value may take the form of a numeric value (e.g., "0"), an alphanumeric value, a text value (e.g., "false"), or a "null" value, among other possibilities.

The verification tag may further include one or more additional values. As one example, the verification tag may include an identifier for the particular system of the computing platform that applied the verification tag (e.g., if the verification tag is applied by a tagging system of the computing platform, the verification tag may include the tagging system's identifier), which may take various forms as described above. As another example, the verification tag may also include a time stamp value of the date and time when the verification tag was applied. Other examples are also possible.

At block 308, after applying the verification tag to the at least one identified parameter within the user access request requiring a permission verification, the computing platform may proceed to perform the permission verification with respect to the at least one identified parameter. In general, the function of performing the permission verification with respect to the at least one identified parameter may involve checking permission information for the given user that is available to the computing platform, such as permission information stored in a permission database (or the like) that is accessible by the platform, in order to determine whether the given user has the appropriate permission with respect to the at least one identified parameter. This permission verification function may take any of various forms, which may depend in part on the type of parameter being checked.

As one possible example, if an identified parameter comprises a resource identifier, the function of performing the permission verification with respect to the resource identifier may involve checking permission information for the given user to determine whether or not the given user is permitted to access the particular resource that is identified by the resource identifier.

As another possible example, if an identified parameter comprises SQL syntax, the function of performing the permission verification with respect to the SQL syntax may involve (i) identifying the type of SQL query indicated by the SQL syntax and (ii) checking permission information for the given user to determine whether or not the given user has permission to make that particular type of SQL query.

As yet another possible example, if an identified parameter comprises an HTML tag, the function of performing the permission verification with respect to the HTML tag may involve (i) determining whether the HTML tag includes an embedded script and (ii) if so, checking permission information for the given user to determine whether or not the given user has permission to embed scripts into the identified HTML tag.

The function of performing the permission verification with respect to the at least one identified parameter may take other forms as well.

Such permission information may be stored within the computing platform. For example, the permission information may be stored in a database accessible by the computing platform that lists all users of the computing platform and each user's respective permissions with respect to certain resources hosted by the computer platform.

The permission information may take various forms. As one example, the permission information may take the form of user-specific permission information that defines the individual permissions for each user of the computing platform. Such user-specific permission information may include, among other information, what resources each user is permitted to access, what actions each user is permitted to take with respect to such resources, and perhaps also what permission each user has with respect to other actions such as inputting SQL syntax, embedding scripts into HTML tags, or the like. As another example, permission information may take the form of role-based permission information. Such role-based permission information may include, among other information, (i) each computing platform user's assigned role and (ii) each role's respective permissions, including what resources each role is permitted to access, what actions each role is permitted to take with respect to such resources, and perhaps also what permission each role has with respect to other actions such as inputting SQL syntax, embedding scripts into HTML tags, or the like. Other examples are also possible.

The permission verification that is performed by the computing platform with respect to the at least one identified parameter may result in one of several possible outcomes. For instance, as one possible outcome, the computing platform may determine that the given user does have the appropriate permission with respect to the at least one identified parameter, in which case the permission verification may succeed. As another possible outcome, the computing platform may determine that the given user does not have the appropriate permission with respect to the at least one identified parameter, in which case the permission verification may not succeed. As yet another possible outcome, the computing platform may determine that the given user's permission with respect to the at least one identified parameter warrants a further audit, which could be the case in certain kinds of situations, such as (i) a situation where the computing platform determines that the given user does have the appropriate permission with respect to the at least one identified parameter but the identified parameter is particularly sensitive such that a further audit of the given user's permission is still desirable or (ii) a situation where the computing platform determines that the given user does not appear to have the appropriate permission with respect to the at least one identified parameter but it is nevertheless desirable to grant the user's access request and then perform a further audit of why the permission verification did not succeed at a later time (e.g., in order to allow the disclosed technique to be tested and evaluated in a live environment in a way that will not alter how user access requests are handled during the testing). Other outcomes of the permission verification are possible as well.

At block 310, if the computing platform successfully performs the permission verification with respect to the at least one identified parameter, the computing platform may then update the verification tag for the at least one identified parameter to indicate this updated status of the permission verification, such as by setting the verification tag to a second value indicating that the permission verification with respect to the at least one identified parameter was successful. For instance, the computing platform may change the value of the verification tag from the first value to the second value, indicating that the permission verification has been performed successfully with respect to the at least one identified parameter. In this respect, as with the first value, the second value of the verification tag for the at least one identified parameter indicating that permission verification has been performed successfully may take various forms. For example, the second value of the verification tag may take the form of a numeric value (e.g., "1"), an alphanumeric value, or a text value (e.g., "true"), among other possibilities. The second value of the verification tag may take other forms as well.

Furthermore, the computing platform may update any additional values that are included in the verification tag. For example, if the verification tag includes an identifier for the particular system of the computing platform that applied the verification tag, the computing platform may update the verification tag to include the identifier of the particular system that performed the permission verification (e.g., the verification tag may be updated with the permission system's identifier). Similarly, if the verification tag includes a time stamp value indicating the date and time when the verification tag was applied, the computing platform may include a time stamp value indicating the date and time when the permission verification was performed. Other examples are also possible On the other hand, if the permission verification was not successful (e.g., the computing platform has determined that the given user does not have the appropriate permission with respect to the at least one identified parameter), the computing platform may leave the initial value of the verification tag unchanged, such that the verification tag continues to indicate that the permission verification with respect to the at least one identified parameter has not been successfully performed.

As noted above, in some implementations, the computing platform may also determine that the given user's permission with respect to the at least one identified parameter warrants a further audit. If the computing platform makes such a determination, the computing platform may apply to the verification tag, in addition to the value indicating the status of the permission verification, an additional value indicating that the given user's permission with respect to the at least one identified parameter warrants a further audit.

At block 312, the computing platform may then use the verification tag for the at least one identified parameter as a basis for determining how to process the user access request.

For example, if the value of the verification tag for the at least one identified parameter indicates that the given user has the appropriate permission with respect to the at least one identified parameter, the computing platform may grant the user access request and then take certain actions to execute the user access request. For example, if the user access request seeks to read a given resource, the computing platform may provide the given user with access to the given resource by sending an instruction to the given user's client station that causes the client station display an electronic version of the given resource to the given user. As another example, if the user access request seeks to update a given resource, the computing platform may locate the given resource in storage and apply the requested update to the given resource. The computing platform may additionally send an instruction to the given user's client station that causes the client station display an electronic version of the updated resource to the given user. As yet another example, if the user access request seeks to link one resource with another (e.g., link a given resource with a particular user), the computing platform may locate the given resource in storage and update the given resource by assigning the given resource to the particular user. As still another example, if the user access request seeks to delete a given resource, the computing platform may locate the given resource and delete it from the computing platform's storage. Other examples of actions that the computing platform may take after granting the user access request are also possible.

On the other hand, if the value of the verification tag for the at least one identified parameter indicates that the permission verification has not been successfully performed with respect to the at least one identified parameter, the computing platform may deny the user access request. This outcome may come about in at least two different ways. As one possibility, this outcome may come about if the permission verification was performed with respect to the at least one identified parameter and that permission verification was not successful because the given user does not have the appropriate permission with respect to the at least one identified parameter. As another possibility, this outcome may come about if permission verification was simply not performed at all with respect to the at least one identified parameter, which may occur in situations where there is a potential vulnerability in the computing platform's program code that allows certain user access requests to bypass the permission verification. Notably, as discussed above, the disclosed technique facilitates mitigation of such vulnerabilities by enabling the computing platform to "catch" any user access requests that may have bypassed the permission verification, thereby minimizing the risk of granting an unauthorized user access request.

If the computing platform denies the user request, the computing platform may optionally store the denied user access request in a log to keep track of denied requests and potential security threats. The computing platform may also take other actions after denying the user access request as well.

In implementations where a verification tag indicates that a further audit is warranted, the computing platform may take certain actions related to performing the audit, either before or after granting or denying the user access request. Such actions may include, for example, storing in a log (i) the user access request, (ii) the identified parameter in the user access request requiring a permission verification, and (iii) the status of the permission verification with respect to the identified parameter. Additionally, even if a verification tag does not indicate that an audit is warranted, the computing platform may nevertheless still determine while processing the user access request that an audit is warranted and then take appropriate actions related to performing the audit, either before or after granting or denying the user access request.

In some implementations, the computing platform may update the verification tag in other ways. For example, the computing platform may determine that additional information is required to successfully complete the permission verification with respect to the at least one identified parameter. In such an instance, the computing platform may update the verification tag for the at least one identified parameter to indicate that the user access request needs further analysis prior to being processed. Other examples are also possible.

It should be understood that the functions described above with respect to blocks 302-312 of FIG. 3 illustrate merely one possible implementation of the disclosed technique, and that the disclosed technique may be implemented in various other manners as well, including the possibility that illustrated functions may be added, removed, rearranged into different orders, combined into fewer functions, and/or separated into additional functions, depending on the particular implementation.

For instance, while the disclosed technique has been described above in the context of an example where a computing platform identified and applied a verification tag to a single parameter within a user access request that requires a permission verification, it should be understood that the disclosed technique may be used by a computing platform to identify and apply a respective verification tag to each of multiple different parameters within a user access request that require a permission verification.

In such an example, after receiving the user access request, the computing platform may first identify the multiple parameters within the user access request that each require a permission verification. As discussed above, the computing platform may perform this identification using available information about the computing platform's API, which may take the form of an API schema that defines which parameters are expected to be included in the user access request, among other possibilities.

In general, as described above, a user access request may include various parameters, and not every parameter may be of a type for which the given user's permissions need to be verified before the user access request is granted. For example, a parameter may contain information about the size of a given resource the given user is seeking to access. Such a parameter may not require a permission verification prior to granting the given user access request and therefore may not be identified as requiring a permission verification. However, a parameter comprising a resource identifier for the given resource would generally require a permission verification prior to granting the given user access to the given resource and may thus be identified as requiring a permission verification.

After identifying the multiple parameters within the user access request that each require a permission verification, the computing platform may then apply a respective verification tag to each identified parameter. The respective verification tag for each identified parameter may initially be set to a first value as described above, indicating that a permission verification has not been successfully performed with respect to each identified parameter. The respective verification tag for each identified parameter may also include additional values as described above.

After applying a respective verification tag to each identified parameter, the computing platform may then proceed to perform a permission verification for each identified parameter. This permission verification may take various forms. As one possibility, the computing platform may perform the permission verification on a parameter-by-parameter basis. For instance, for each identified parameter, the computing platform may access permission information for the given user that is applicable to each identified parameter and then use that permission information to determine whether the given user has the appropriate permission with respect to each identified parameter. As another possibility, the computing platform may group certain of the identified parameters together (e.g., based on the types of the identified parameters) and then perform the permission verification on a group-by-group basis. For instance, for each group of identified parameters, the computing platform may access permission information for the given user that is applicable to the group of identified parameters (e.g., information indicating the given user's permission to access resources of a particular type) and then use that permission information to determine whether the given user has the appropriate permission with respect to the group of identified parameters. The computing platform may perform the permission verification in other ways as well.

If the computing platform successfully performs the permission verification for the given user with respect to each identified parameter, the computing platform may update the respective verification tag for each identified parameter to indicate this updated status of the permission verification. For example, if the computing platform determines that the permission verification for a given identified parameter was successfully performed and the given user does indeed have the appropriate permission with respect to the given identified parameter, the computing platform may update the respective verification tag for the given identified parameter by setting the verification tag to a second value, as described above, indicating that the permission verification was successful. In this way, the computing platform may similarly update the respective verification tag for each identified parameter for which permission verification was successfully performed.

Other ways of updating a verification tag are also possible. For example, in some embodiments, the computing platform may be configured to bulk update multiple verification tags simultaneously.

On the other hand, if the computing platform determines that the permission verification with respect to a given identified parameter was not successful and the given user does not have the appropriate permission with respect to the given identified parameter, the computing platform may leave the first value of the verification tag for the given identified parameter unchanged, in which case the verification tag may continue to indicate that the permission verification with respect to the given identified parameter has not been successfully performed. In this way, the computing platform may leave unchanged the respective verification tag for each identified parameter in the user access request for which verification permission was not successful.

In implementations where the computing platform may determine that a further audit is warranted with respect to a given identified parameter, the computing platform may apply, to the verification tag for the given identified parameter, an additional value indicating that a further audit is warranted. In this way, the computing platform may update the respective verification tag for each identified parameter in the user access request for which a further audit is warranted.

After updating the respective verification tag for each identified parameter as needed, the computing platform may process the user access request. The computing platform may process the user access request in various ways.

As one possibility, if the respective verification tag for each identified parameter indicates that the permission verification for each identified parameter was successfully performed, the computing platform may grant the user access request and take certain actions to execute the user access request as described above.

As another possibility, if the respective verification tag for each identified parameter indicates that the permission verification for each identified parameter has not been successfully performed, the computing platform may deny the user access request.

As yet another possibility, it is possible that the permission verification may have been successful for certain identified parameters and may not have been successful for certain other identified parameters. In such an instance where the verification tags for the identified parameters within a user access request have differing values, the computing platform may process the user access request in various ways. As one example, the computing platform may (i) grant the user access request for only those aspects of the user access request that correspond with identified parameters for which permission verification was successfully performed and (ii) deny the user access request for those aspects of the user access request with respect to which the permission verification was not successful. To illustrate, if the user access requests seeks to update both a first resource and a second resource, and the computing platform has determined that the given user has the appropriate permission to read and update the first resource and the appropriate permission to view the second resource, the computing platform may (i) grant the user access request with respect to the first resource and (ii) deny the user access request with respect to the second resource. Other examples are also possible.

In implementations where the computing platform may determine that a further audit is warranted and a verification tag for a given identified parameter indicates that a further audit is warranted, the computing platform may take certain actions related to performing the audit, either before or after granting or denying the user access request. Alternatively, where a verification tag for a given identified parameter does not indicate that a further audit is warranted, the computing platform may nevertheless still determine that an audit is warranted and then take appropriate actions related to performing the audit, either before or after granting or denying the user access request.

Furthermore, in some implementations, the computing platform may be configured to determine that a permission verification is incomplete with respect to a given parameter. For example, the computing platform may determine that a verification tag has only a first value and a first time stamp, indicating that the given parameter bypassed the permission verification. In that case, the computing platform may flag the user access request to undergo a permission verification before processing the user access request.

For purposes of illustration in line with the discussion above, examples scenarios are described below to demonstrate how the disclosed technique may be applied with reference to a computing platform that provides a web application for assisting with construction management, which may be accessed by client stations associated with construction companies, contractors, and other construction parties.

In one example scenario, the computing platform may receive a user access request on behalf of a contractor seeking to update a given RFI related to a given particular construction project. The user access request may be generated and sent by a client station based on input provided by the contractor at the client station.

The user access request may include various parameters related to the access being sought by the contractor (e.g., related to the RFI the contractor is seeking to update). For example, the user access request may include parameters related to the contractor's assigned role (e.g., "contractor_id=1234"), the given RFI (e.g., "doc_type=rfi" and "rfi_id=567") and the project with which the RFI is associated (e.g., "project_name=CityMuseum" and "project_id=890"). The user access request may include additional information as well, such as an authorization token indicating that the contractor is authorized to access the computing platform. Other information, including additional parameters, may also be included.

After receiving the user access request, the computing platform may identify at least one parameter in the user access request that requires a permission verification before the user access request is granted. The computing platform may use available information about the computing platform's API, such as the computing platform's API schema, to identify the at least one parameter as described above. For example, the computing platform may determine using the API schema that the data field "rfi_id" requires a permission verification. As a result, the computing platform may identify the "rfi_id=567" parameter in the user access request as requiring a permission verification before the user access request may be processed.

After identifying the parameter in the user access request that requires a permission verification, the computing platform may proceed to apply to the identified parameter "rfi_id=567" a verification tag, which may initially be set to a first value indicating that the permission verification has not been successfully performed. For example, the computing platform may apply a verification tag initially set to a first value (e.g., "false"), indicating that successful permission verification has not been performed with respect to the "rfi_id=567" parameter.

After applying the verification tag to the identified parameter, the computing platform may proceed to perform the permission verification in order to determine whether the contractor has permission with respect to the identified parameter. The computing platform may access available permission information such as user-specific permission information. For example, the user-specific permission information for the contractor may indicate that the contractor does have the appropriate permission to update the RFI designated as "rfi_id=567."

After successfully performing the permission verification with respect to the "rfi_id=567" parameter, the computing platform may the verification tag for the "rfi_id=567" parameter by setting the verification tag to a second value (e.g., "true") indicating that the permission verification was successfully performed.

The computing platform may then process the user access request. Based on the verification tag (e.g., "true") of the identified parameter, the computing platform may grant the user access request and then take certain actions to execute the user access request. For example, the computing platform may grant the contractor's request to update the given RFI by locating the RFI designated as "rfi_id=567" in storage, applying the contractor's requested update to the given RFI, and sending an instruction to the contractor's client station that causes the client station to display an electronic version of the updated RFI.

In another example scenario, the computing platform described above may receive a user access request on behalf of an administrator of a construction company seeking to update a given permission template for Construction Company A to allow a given user to delete submitted bids.

The user access request may be generated and sent by a client station based on input provided by the administrator at the client station and may include various parameters related to the access being sought by the administrator (e.g., update a given permission template).

After receiving the user access request, the computing platform may identify, using available information about the computing platform's API as discussed above, at least one parameter requiring a permission verification prior to granting the user access request. For example, the user access request may include the following parameters: "administrator_id=213," "permission_template_id=564," and "company_id=897," and the computing platform may identify "permission_template_id=564" and "company_id=897" as parameters requiring a permission verification.

After identifying the at least one parameter requiring a permission verification, the computing platform may apply a respective verification tag to each respective identified parameter. As discussed above, the verification tag may initially be set to a first value (e.g., "false") indicating that each identified parameter requires a permission verification. As such, the computing platform may apply a verification tag with a first value "false" to each of the identified parameters "permission_template_id=564" and "company_id=897."

The computing platform may then proceed to perform the permission verification for each identified parameter by accessing available permission information for the administrator with respect to the identified parameters. For example, the computing platform may access user-specific permission information that may indicate that the administrator is not an employee of the company designated as "company_id=897" (Construction Company A) and does not have the appropriate permission to update the permission template designated as "permission_template_id=564." Because the permission verification was not successful, the computing platform may leave the first value (e.g., "false") of the respective verification tag for each of the parameters "permission_template_id=564" and "company_id=897" unchanged so that the respective verification tag for each identified parameter continues to indicate that successful permission verification was not performed.

The computing platform may then proceed to process the user access request, using the respective verification tag for each identified parameter as a basis for determining how to process the user access request. Because the respective verification tag for each identified parameter indicates that permission verification was not successful, the computing platform may deny the user access request. The computing platform may additionally store the denied user access request in a log to keep track of denied requests and potential security threats.

In this way, the disclosed technique enables the computing platform to minimize the risk of unauthorized user access to platform resources.

Figure 4:
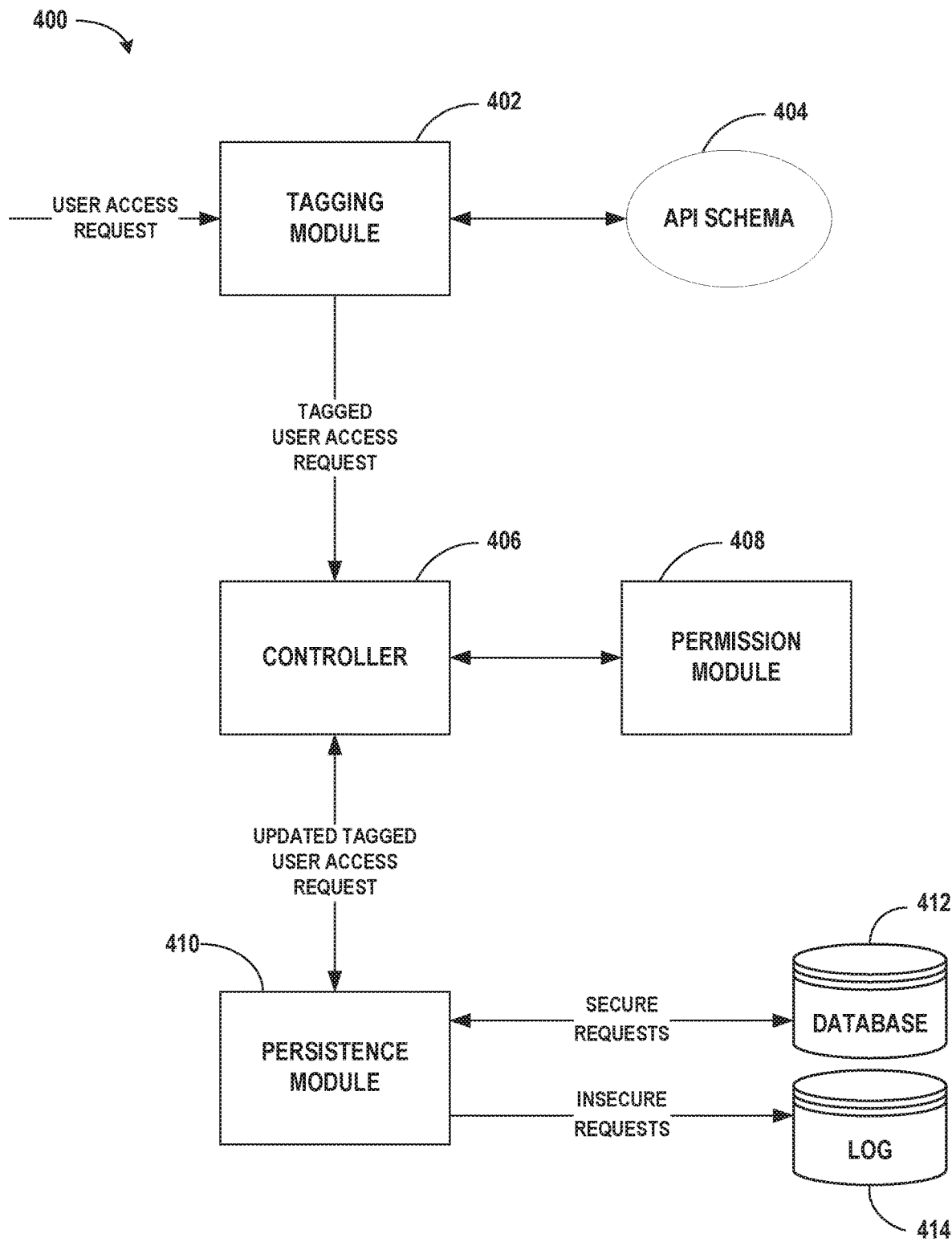
FIG. 4 depicts an example implementation of the functional systems that may carry out the example process of FIG. 3.

Turning now to FIG. 4, an example implementation 400 of the functional systems of a computing platform (e.g., computing platform 200) that may carry out the disclosed technique as described with respect to blocks 302-312 of FIG. 3 is shown. These functional systems, which may also be referred to herein as "modules" of the computing platform, may generally take the form of respective sets of program instructions that are executable by the one or more computing systems of the computing platform.

As shown in FIG. 4, a computing platform may receive a user access request on behalf of a given user to access a given resource (e.g., as described above with respect to block 302 of FIG. 3). The user access request may be generated by a client station (e.g., client station 112 of FIG. 1) based on input provided by the given user at the client station. The user access request may be received a tagging module 402 of the computing platform.

After receiving the user access request, the tagging module 402 may identify at least one parameter in the user access request that requires a permission verification by using available information about the computing platform's API, such as API schema 404 (e.g., as described above with respect to block 304 of FIG. 3). The tagging module 402 may then apply a verification tag to the at least one identified parameter (e.g., as described above with respect to block 306 of FIG. 3). The verification tag may initially be set to a first value (e.g., "false") indicating that the permission verification has not been successfully performed with respect to the at least one identified parameter. The verification tag may also include an identifier corresponding to the tagging module 402, indicating that the tagging module 402 applied the verification tag to the at least one identified parameter, and a timestamp value indicating the date and time the verification tag was applied. After applying the verification tag to the at least one identified parameter, the tagging module 402 may then pass the user access request to a controller 406.

After receiving the user access request from the tagging module 402, the controller 406 may pass the tagged user access request to the permission module 408. The permission module 408 may then perform a permission verification for the given user with respect to the at least one identified parameter (e.g., as described above with respect to block 308 of FIG. 3). To perform the permission verification, the permission module 408 may access available permission information to determine if the given user has the appropriate permission with respect to the at least one identified parameter. If the permission verification is successful, the permission module 408 may update the verification tag for the at least one identified parameter (e.g., as described above with respect to block 310 of FIG. 3) by setting the verification tag to a second value (e.g., "true"), indicating that the permission verification was successful. Additionally, the permission module 408 may include an identifier corresponding to the permission module 408 to indicate that the permission module 408 has set (i) the verification tag to the second value indicating that permission verification was successfully performed and (ii) a timestamp value indicating the date and time the verification tag was updated by the permission module 408. Furthermore, the permission module 408 may include an additional value to indicate that a further audit of the at least one identified parameter is warranted. The permission module 408 may then pass the user access request with the updated verification tag back to the controller 406, which may, in turn, forward the user access request to a persistence module 410.

After receiving the user access request, the persistence module 410 may process the user access request, using the verification tag for the at least one identified parameter as a basis (e.g., as described above with respect to block 312 of FIG. 3). The persistence module 410 may determine that the verification tag for the at least one identified parameter indicates that the permission verification was performed successfully with respect to the at least one identified parameter. The persistence module 410 may accordingly grant the user access request and take certain actions to execute the user access request. For example, the persistence module 410 may interact with a database 412 to locate and/or update the given resource based on the nature of the user access request.

On the other hand, if the persistence module 410 were to determine that the verification tag for the at least one identified parameter indicates that the permission verification was not successful and the given user does not have the appropriate permission with respect to the at least one identified parameter, the persistence module 410 may deny the user access request.

Furthermore, the persistence module 410 may store the denied user access request in a log 414 to keep track of denied requests and potential security threats. 11181 Furthermore, if the verification tag indicates that a further audit is warranted, the persistence module 410 may take certain actions related to performing the audit, either before or after granting or denying the user access request. Such actions may include, for example, storing in a log the user access request and the permission verification status of the at least one identified parameter. Additionally, even where a verification tag does not indicate that a further audit is warranted, the persistence module 410 may still nevertheless determine that an audit is warranted and take appropriate actions related to performing the audit, either before or after granting or denying the user access request.

In some examples, the persistence module 410 may determine that the permission verification is incomplete (e.g., the user access request has bypassed permission verification) or that the at least one identified parameter otherwise requires further analysis. In such instances, the persistence module 410 may be configured to send the user access request back to the control 406 for further action.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "users" or other entities, this is for purposes of example and explanation only. Claims should not be construed as requiring action by such actors unless explicitly recited in claim language.

The invention claimed is:

1. A computing platform comprising:
   a network interface;
   at least one processor;
   a non-transitory computer-readable medium; and
   program instructions stored on the non-transitory computer-readable medium that are executable by the at least one processor such that the computing platform is configured to:
      receive a request to access one or more resources on behalf of a given user;
      identify a parameter within the request that requires a permission verification;
      append, to the request, a verification tag for the parameter that comprises a verification status indicator that indicates whether or not a permission verification has been successfully performed for the given user with respect to the parameter, wherein the verification status indicator is set to a first value indicating that a permission verification has not been successfully performed for the given user with respect to the parameter;
      after appending the verification tag, perform a permission verification for the given user with respect to the parameter;
      based on performing the permission verification for the given user with respect to the parameter, either (i) update the verification tag status indicator from the first value to a second value indicating that a permission verification has been successfully performed for the given user with respect to the parameter if the given user's permission with respect to the parameter is successfully verified or (ii) leave the verification status indicator set to the first value if the given user's permission with respect to the parameter is not successfully verified; and
      determine whether to grant or deny the request based at least in part on the verification status indicator for the parameter.

2. The computing platform of claim 1, wherein the program instructions stored on the non-transitory computer-readable medium that are executable by the at least one processor such that the computing platform is configured to identify the parameter within the request that requires a permission verification comprise program instructions stored on the non-transitory computer-readable medium that are executable by the at least one processor such that the computing platform is configured to:
   use available information about an Application Programming Interface (API) of the computing platform to identify the parameter within the request that requires a permission verification.

3. The computing platform of claim 1, wherein the parameter comprises an identifier of a given resource of the one or more resources for which access is requested.

4. The computing platform of claim 3, wherein the program instructions stored on the non-transitory computer-readable medium that are executable by the at least one processor such that the computing platform is configured to perform the permission verification for the given user with respect to the parameter comprise program instructions stored on the non-transitory computer-readable medium that are executable by the at least one processor such that the computing platform is configured to:
   obtain permission information for the given user; and
   based on the obtained permission information and the identifier of the given resource, determine whether the given user has permission to access the given resource.

5. The computing platform of claim 1, wherein the request to access the one or more resources on behalf of the given user is received from a client station associated with the given user.

6. The computing platform of claim 1, wherein the program instructions stored on the non-transitory computer-readable medium that are executable by the at least one processor such that the computing platform is configured to determine whether to grant or deny the request based at least in part on the verification status indicator for the parameter comprise program instructions stored on the non-transitory computer-readable medium that are executable by the at least one processor such that the computing platform is configured to:
   determine that the verification status indicator for the parameter is set to the second value indicating that a permission verification has been successfully performed for the given user with respect to the parameter; and
   in response to determining that the verification status indicator for the parameter is set to the second value, grant the request.

7. The computing platform of claim 6, wherein the request to access the one or more resources comprises a request to view the one or more resources, the computing platform further comprising program instructions stored on the non-transitory computer-readable medium that are executable by the at least one processor such that the computing platform is configured to:
   after granting the request, cause a client station associated with the given user to display an electronic version of the one or more resources.

8. The computing platform of claim 6, wherein the request to access the one or more resources comprises a request to update the one or more resources, the computing platform further comprising program instructions stored on the non-transitory computer-readable medium that are executable by the at least one processor such that the computing platform is configured to:
   after granting the request, (i) update the one or more resources according to the request, and (ii) cause a client station associated with the given user to display an electronic version of the updated one or more resources.

9. The computing platform of claim 1, wherein the program instructions stored on the non-transitory computer-readable medium that are executable by the at least one processor such that the computing platform is configured to determine whether to grant or deny the request based on at least in part on the verification status indicator for the parameter comprise program instructions stored on the non-transitory computer-readable medium that are executable by the at least one processor such that the computing platform is configured to:
   determine that the verification status indicator for the parameter is set to the first value indicating that a permission verification has not been successfully performed for the given user with respect to the parameter; and
   in response to determining that the verification status indicator for the parameter is set to the first value, deny the request.

10. The computing platform of claim 9, further comprising program instructions stored on the non-transitory computer-readable medium that are executable by the at least one processor such that the computing platform is configured to:
store a record of the denied request in a log.

11. At least one non-transitory computer-readable medium, wherein the at least one non-transitory computer-readable medium is provisioned with program instructions that, when executed by at least one processor, cause a computing platform to:
receive a request to access one or more resources on behalf of a given user;
identify a parameter within the request that requires a permission verification;
append, to the request, a verification tag for the parameter that comprises a verification status indicator that indicates whether or not a permission verification has been successfully performed for the given user with respect to the parameter, wherein the verification status indicator is set to a first value indicating that a permission verification has not been successfully performed for the given user with respect to the parameter;
after appending the verification tag, perform a permission verification for the given user with respect to the parameter;
based on performing the permission verification for the given user with respect to the parameter, either (i) update the verification status indicator from the first value to a second value indicating that a permission verification has been successfully performed for the given user with respect to the parameter if the given user's permission with respect to the parameter is successfully verified or (ii) leave the verification status indicator set to the first value if the given user's permission with respect to the parameter is not successfully verified; and
determine whether to grant or deny the request based at least in part on the verification status indicator for the parameter.

12. The at least one non-transitory computer-readable medium of claim 11, wherein the program instructions that, when executed by the at least one processor, cause the computing platform to identify the parameter within the request that requires a permission verification comprise program instructions that, when executed by the at least one processor, cause the computing platform to:
use available information about an Application Programming Interface (API) of the computing platform to identify the parameter within the request that requires a permission verification.

13. The at least one non-transitory computer-readable medium of claim 11, wherein the parameter comprises an identifier of a given resources of the one or more resources for which access is requested.

14. The at least one non-transitory computer-readable medium of claim 13, wherein the program instructions that, when executed by the at least one processor, cause the computing platform to perform the permission verification for the given user with respect to the parameter comprise program instructions that, when executed by the at least one processor, cause the computing platform to:
obtain permission information for the given user; and
based on the obtained permission information and the identifier of the given resource, determine whether the given user has permission to access the given resource.

15. The at least one non-transitory computer-readable medium of claim 11, wherein the program instructions that, when executed by the at least one processor, cause the computing platform to determine whether to grant or deny the request based at least in part on the verification status indicator for the parameter comprise program instructions that, when executed by the at least one processor, cause the computing platform to:
determine that the verification status indicator for the parameter is set to the second value indicating that a permission verification has been successfully performed for the given user with respect to the parameter; and
in response to determining that the verification status indicator for the parameter is set to the second value, grant the request.

16. The at least one non-transitory computer-readable medium of claim 15, wherein the request to access the one or more resources comprises a request to view the one or more resources, and wherein the at least one non-transitory computer-readable medium is also provisioned with program instructions that, when executed by the at least one processor, cause the computing platform to:
after granting the request, cause a client station associated with the given user to display an electronic version of the one or more resources.

17. The at least one non-transitory computer-readable medium of claim 15, wherein the request to access the one or more resources comprises a request to update the one or more resources, and wherein the at least one non-transitory computer-readable medium is also provisioned with program instructions that, when executed by the at least one processor, cause the computing platform to:
after granting the request, (i) update the one or more resources according to the request, and (ii) cause a client station associated with the given user to display an electronic version of the updated one or more resources.

18. The at least one non-transitory computer-readable medium of claim 11, wherein the program instructions that, when executed by the at least one processor, cause the computing platform to determine whether to grant or deny the request based at least in part on the verification status indicator for the parameter comprise program instructions that, when executed by the at least one processor, cause the computing platform to:
determine that the verification status indicator for the parameter is set to the first value indicating that a permission verification has not been successfully performed for the given user with respect to the parameter; and
in response to determining that the verification status indicator for the parameter is set to the first value, deny the request.

19. The at least one non-transitory computer-readable medium of claim 18, wherein the non-transitory computer-readable medium is also provisioned with program instructions that, when executed by the at least one processor, cause the computing platform to:
store a record of the denied request in a log.

20. A method performed by a computing platform, the method comprising:
receiving a request to access one or more resources on behalf of a given user;
identifying a parameter within the request that requires a permission verification;

appending, to the request, a verification tag for the parameter that comprises a verification status indicator that indicates whether or not a permission verification has been successfully performed for the given user with respect to the parameter, wherein the verification status indicator is set to a first value indicating that a permission verification has not been successfully performed for the given user with respect to the parameter;

after appending the verification tag, performing a permission verification for the given user with respect to the parameter;

based on performing the permission verification for the given user with respect to the parameter, either (i) updating the verification status indicator from the first value to a second value indicating that a permission verification has been successfully performed for the given user with respect to the parameter if the given user's permission with respect to the parameter is successfully verified or (ii) leaving the verification status indicator set to the first value if the given user's permission with respect to the parameter is not successfully verified; and determining whether to grant or deny the request based at least in part on the verification status indicator for the parameter.

* * * * *